(12) United States Patent
Kim et al.

(10) Patent No.: US 8,040,471 B2
(45) Date of Patent: Oct. 18, 2011

(54) LIQUID CRYSTAL DISPLAY INCLUDING COLOR FILTERS, AND MANUFACTURING METHOD THEREOF

(75) Inventors: Hee-Joon Kim, Cheonan-si (KR); Joo-Han Kim, Yongin-si (KR); Yeo-Geon Yoon, Seoul (KR); Jun-Ho Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 484 days.

(21) Appl. No.: 12/341,236

(22) Filed: Dec. 22, 2008

(65) Prior Publication Data

US 2010/0002172 A1 Jan. 7, 2010

(30) Foreign Application Priority Data

Jul. 1, 2008 (KR) .................. 10-2008-0063522

(51) Int. Cl.
*G02F 1/1335* (2006.01)
*G02F 1/1339* (2006.01)
(52) U.S. Cl. ........................... 349/106; 349/155
(58) Field of Classification Search .............. 349/106, 349/155
See application file for complete search history.

(56) References Cited

U.S. PATENT DOCUMENTS

| 6,271,902 | B1 * | 8/2001 | Ogura et al. .............. 349/106 |
| 6,671,025 | B1 * | 12/2003 | Ikeda et al. .............. 349/156 |
| 7,492,436 | B2 * | 2/2009 | Lim .............................. 349/156 |
| 7,724,324 | B2 * | 5/2010 | Chae et al. ................. 349/106 |
| 2005/0140892 | A1 | 6/2005 | Kim et al. |
| 2005/0253984 | A1 | 11/2005 | Kim et al. |

FOREIGN PATENT DOCUMENTS

| JP | 2000329924 | 11/2000 |
| JP | 2003084266 | 3/2003 |
| JP | 2004361824 | 12/2004 |
| JP | 2007233334 | 9/2007 |
| KR | 1020060012399 A | 2/2006 |
| KR | 1020070000626 A | 1/2007 |
| KR | 1020070063662 A | 6/2007 |

* cited by examiner

*Primary Examiner* — Mike Qi
(74) *Attorney, Agent, or Firm* — Cantor Colburn LLP

(57) ABSTRACT

A liquid crystal display includes a first display panel including a first substrate, and first and second color filters disposed on the first substrate and adjacent to each other, a second display panel including a second substrate facing the first display panel and a first spacer disposed on the second substrate, and a liquid crystal layer disposed between the first and second display panels. The first color filter includes a first protrusion protruded toward and overlapped with the second color filter. The first spacer faces the first protrusion, and the first and second display panels contact each other at a location area of the first spacer.

20 Claims, 7 Drawing Sheets

LIQUID CRYSTAL DISPLAY INCLUDING COLOR FILTERS, AND MANUFACTURING METHOD THEREOF

This application claims priority to Korean Patent Application No. 10-2008-0063522 filed on Jul. 1, 2008, and all the benefits accruing therefrom under 35 U.S.C. §119, the entire contents of which are incorporated herein by reference.

BACKGROUND OF THE INVENTION (a) Field of the Invention

The present invention relates to a display device, and more particularly, to a liquid crystal display including color filters.

(b) Description of the Related Art

Liquid crystal displays are now widely used as a flat panel display. A liquid crystal display has two display panels on which field generating electrodes, such as pixel electrodes and a common electrode are formed, and a liquid crystal layer that is interposed between the panels. In the liquid crystal display, voltages are applied to the field generating electrodes so as to generate an electric field over the liquid crystal layer, and the alignment of liquid crystal molecules of the liquid crystal layer is determined by the electric field. Accordingly, the polarization of incident light is controlled, thereby performing image display.

The liquid crystal display further includes color filters for producing colored images. A color filter may be made an organic material containing pigments. The color filters have been increasingly located on the display panel side with thin film transistors. The color filters each represent one of three primary colors of red, green, and blue, and neighboring color filters may be overlapped with each other near the boundary thereof.

Meanwhile, spacers are provided between the display panels of the liquid crystal display to maintain a distance therebetween, that is, to keep the thickness of the liquid crystal layer substantially constant.

BRIEF SUMMARY OF THE INVENTION

Since a liquid crystal display may include color filters located near a boundary of thin film transistors, and spacers provided between the display panels of a liquid crystal display to maintain a thickness of the liquid crystal layer substantially constant, there are technical difficulties in manufacturing the liquid crystal display apparatus.

For example, while beads have been conventionally sprayed on the display panel, a method of forming columns on the display panel using a material such as an organic material may also be employed. While it is difficult with the bead spacers to control the spacer positions, it may be relatively easier employing the column spacers to essentially freely determine those positions. In employing column spacers, for processing convenience, the spacers may be disposed on the relatively high thin film transistors.

However, as the thin film transistors are disposed near the boundary of the color filters, with the overlapping of the color filters as explained above, the height of the spacer portions is increased so as to further reduce the thickness of the spacers. Where the overlapped portions of the color filters and the non-overlapped portions are formed arbitrarily, it becomes difficult to consistently maintain the distance between the display panels, that is, the cell distance.

An exemplary embodiment of the present invention provides a liquid crystal display including color filters, including advantages of maintaining a cell distance in a constant manner.

An exemplary embodiment of a display device includes a first display panel including a first substrate, and first and second color filters disposed on the first substrate and adjacent to each other. The display device further includes a second display panel including a second substrate facing the first display panel and a first spacer disposed on the second substrate, and a liquid crystal layer disposed between the first and second display panels. The first color filter includes a first protrusion protruded toward and overlapped with the second color filter. The first spacer faces the first protrusion, and the first and second display panels contact each other at the area of the first spacer.

The first protrusion may be smaller in size than the first spacer.

The first display panel may further include a first thin film transistor disposed on the substrate and overlapped with the first protrusion, and a first pixel electrode connected to the first thin film transistor.

The second color filter may be disposed between the first protrusion and the first substrate.

The second color filter may include a second protrusion protruded toward the first color filter and disposed adjacent to the first protrusion.

The first display panel may further include a third color filter disposed adjacent to the second color filter. The first to third color filters display different colors, respectively. The second and third color filters have the same shape as each other, but the first color filter differs in shape from the second and third color filters.

The first display panel may further include a second thin film transistor disposed on the first substrate and separated from the first thin film transistor, and a second pixel electrode connected to the second thin film transistor. The second display panel may further include a second spacer having a same height as the first spacer and facing the second thin film transistor. A first portion of the first display panel facing the second spacer may be lower in height than a second portion of the first display panel facing the first protrusion.

One of the first and second color filters may have a concave portion disposed adjacent to the second thin film transistor.

An exemplary embodiment of a display device includes a first display panel including a first substrate, a plurality of thin film transistors disposed on the first substrate, and first, second, and third color filters disposed on the first substrate and displaying different colors. The display device further includes a second display panel facing the first display panel, and a liquid crystal layer disposed between the first and second display panels. The first to third color filters display different colors, respectively. The second and third color filters have a same shape as each other, and the first color filter has a first portion that differs in shape from the second and third color filters, and a second portion having the same shape as the second and third color filters.

The first portion of the first color filter may be disposed adjacent to the thin film transistor.

The liquid crystal display may further include a spacer overlapped with the first portion of the first color filter.

The first and second display panels may contact each other adjacent to the first portion of the first color filter.

The first portion of the first color filter may be overlapped with the second color filter.

The second color filter may include a protrusion protruded toward the first portion of the first color filter.

The first portion of the first color filter may be disposed at a distance from the second and third color filters.

The spacer may be larger in area than the first portion of the first color filter.

An exemplary embodiment of a method of manufacturing includes disposing a first and a second color filter of a first display panel directly adjacent to each other, the first color filter including a first protruded portion extended in a first direction toward the second color filter, disposing a second display panel facing the first display panel, the second display panel including a spacer disposed facing the first protruded portion of the first color filter, and disposing a liquid crystal layer between the first and second display panels. The first protruded portion overlaps with the second color filter, and the first and second display panels contact each other where the first protruded portion is disposed.

In the exemplary embodiments, a thickness of the liquid crystal layer can be maintained substantially constant, even when a misalignment occurs.

DETAILED DESCRIPTION OF THE INVENTION

Figure 1:
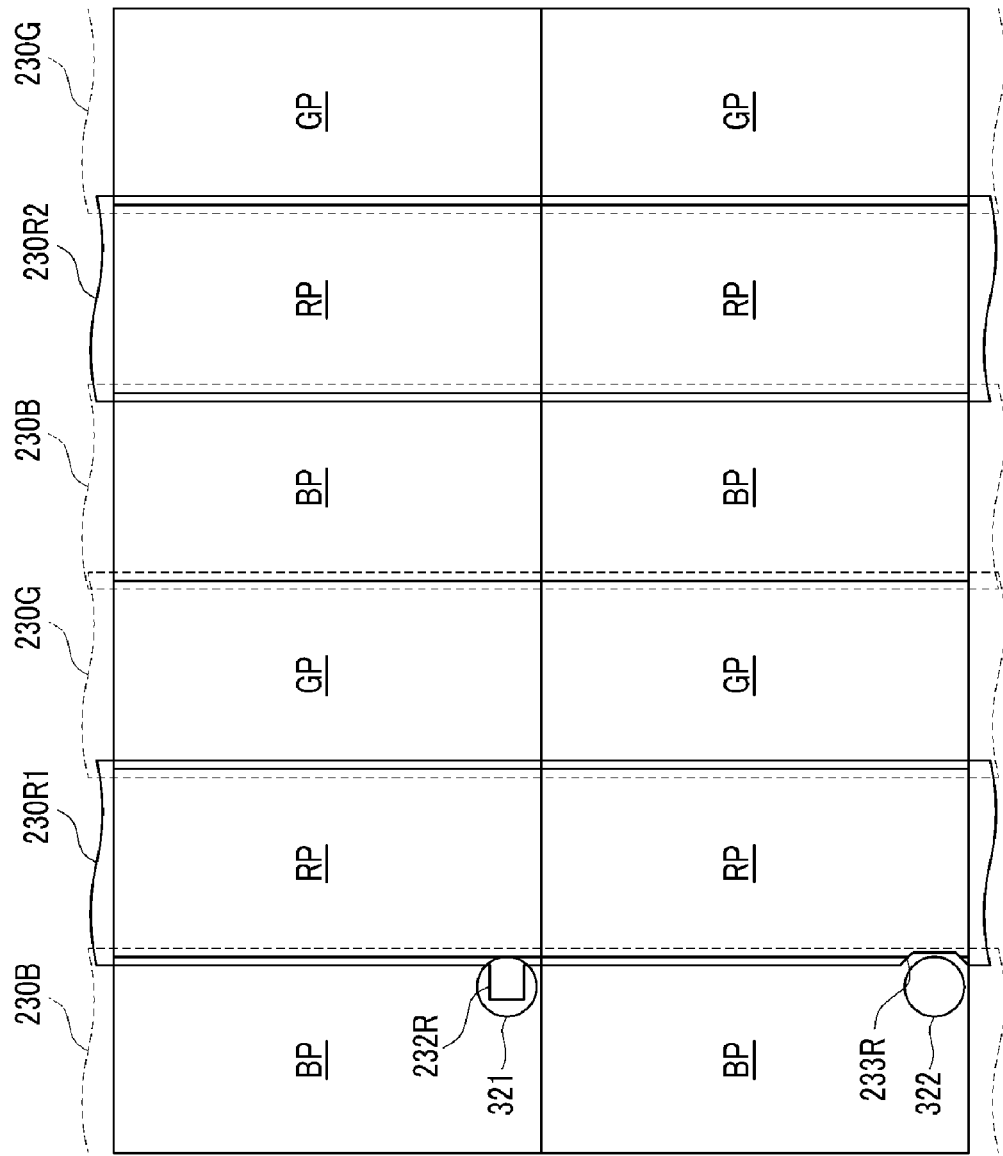
FIG. 1 and FIG. 2 are schematic diagrams of an exemplary embodiment of a liquid crystal display according to the present invention.

The present invention will be described more fully hereinafter with reference to the accompanying drawings, in which exemplary embodiments of the invention are shown. As those skilled in the art would realize, the illustrated embodiments may be modified in various different ways, all without departing from the spirit or scope of the present invention. In the drawings, the thickness of layers, films, panels, regions, etc., are exaggerated for clarity. Like reference numerals designate like elements throughout the specification. It will be understood that when an element such as a layer, film, region, substrate or panel is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

An exemplary embodiment of a liquid crystal display according to the present invention will now be described in detail with reference to FIG. 1 to FIG. 4.

Figure 2:
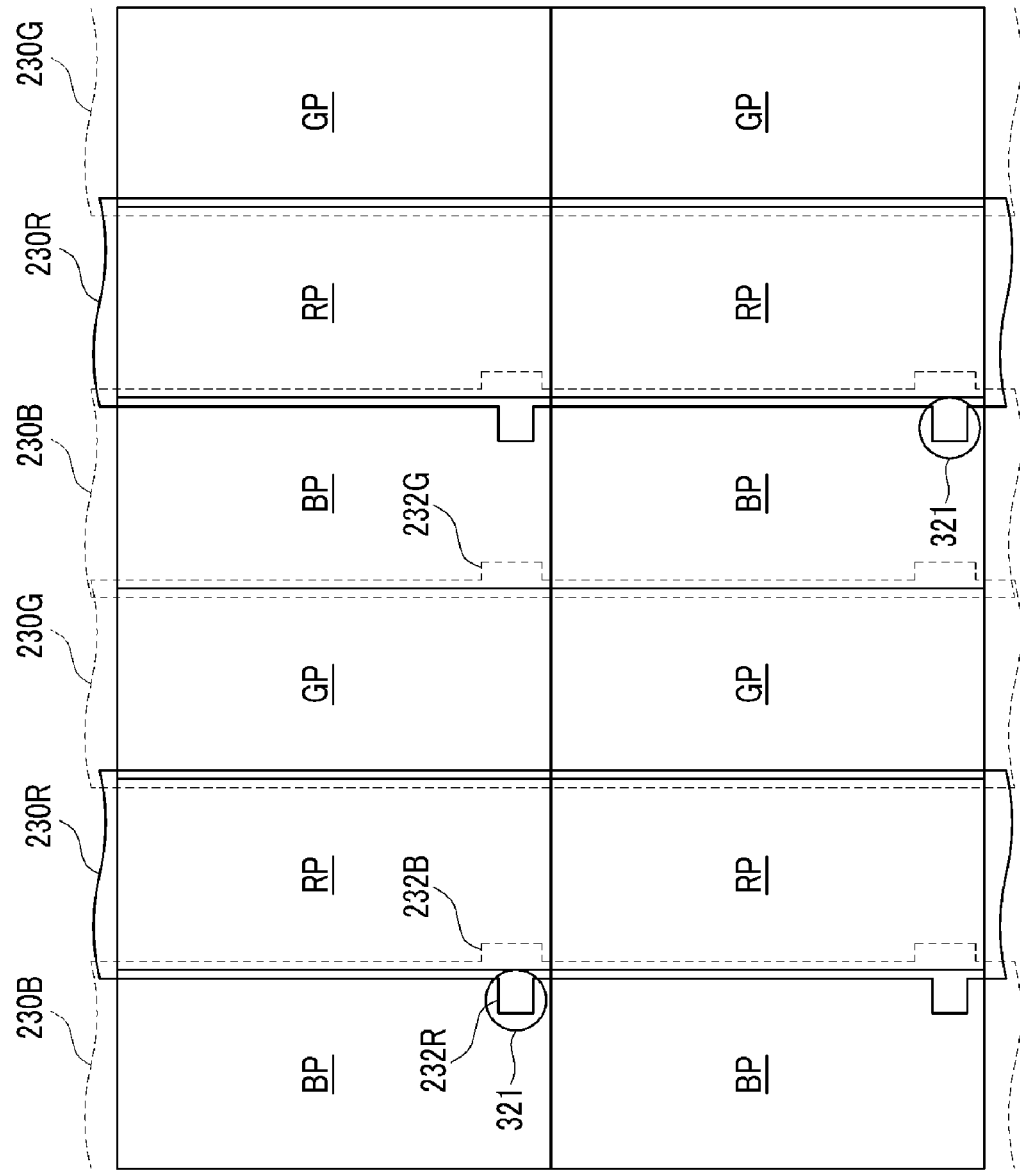
Figure 3:
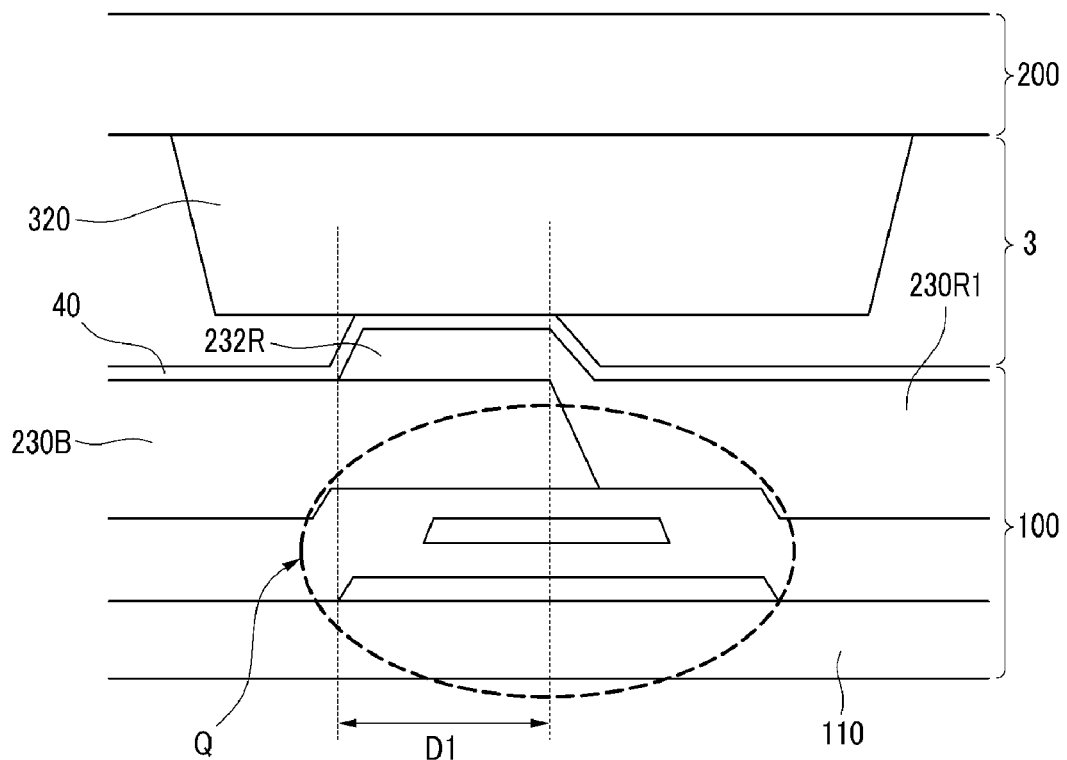
FIG. 3 and FIG. 4 are cross-sectional views of the exemplary embodiment of a liquid crystal display in FIG. 1 and FIG. 2 according to the present invention.
Figure 4:
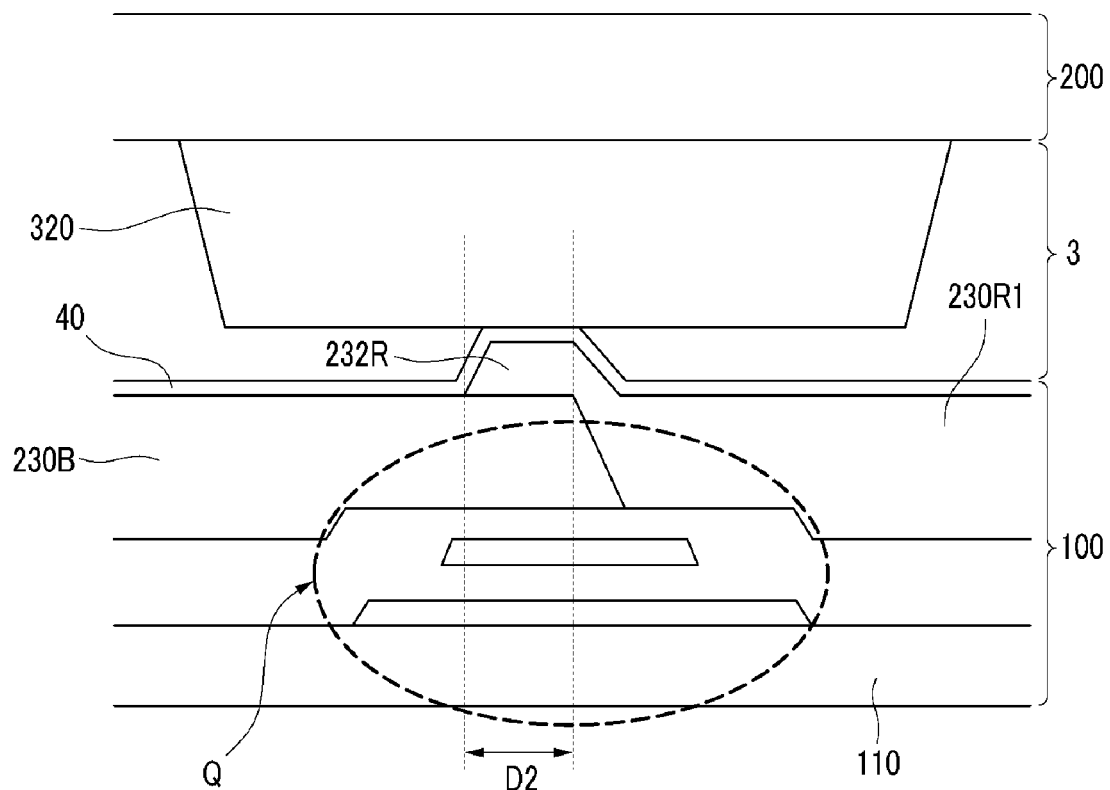

FIG. 1 and FIG. 2 are schematic diagrams of an exemplary embodiment of a liquid crystal display according to the present invention, and FIG. 3 and FIG. 4 are cross-sectional views of the exemplary embodiment of a liquid crystal display in FIG. 1 and FIG. 2 according to the present invention.

Referring to FIG. 1 and FIG. 2, a liquid crystal display includes a plurality of pixel regions RP, GP, and BP, which are demarcated from each other, and are arranged substantially in the form of a matrix. The pixel regions RP, GP, and BP each include a switching element, such as a thin film transistor (not shown), and a liquid crystal capacitor (not shown). The pixel regions RP, GP, and BP may each uniquely display one of primary colors so as to make a desired color be recognized by a spatial or temporal sum of the primary colors. The three primary colors may be based on red, green, and blue. In the illustrated embodiment, the red pixel region RP, the green pixel region GP, and the blue pixel region BP are sequentially arranged in the row direction.

Referring to FIG. 3 and FIG. 4, a liquid crystal display includes first and second display panels 100 and 200, and a liquid crystal layer 3 interposed between the first and second display panels 100 and 200.

The liquid crystal layer 3 may have a positive (+) or negative (−) dielectric anisotropy, and liquid crystal molecules of the liquid crystal layer 3 may be aligned such that the directors thereof stand substantially parallel or perpendicular to the surface of the first and second display panels 100 and 200 with no application of an electric field.

The second display panel 200 includes relatively high column spacers 320 disposed thereon. The column spacers 320 may also be considered a part of the second display panel 200. The relatively high column spacers 320 include a height that is greater than all of the other elements and portions of the second display panel 200. The height is taken in a direction substantially perpendicular to the second display panel 200. An entire of each of the column spacers 320 may be disposed between the first and second display panels 100 and 200. Each of the first and second display panels 100 and 200 may directly contact the column spacers 320, such that the first and second display panels 100 and 200 may be considered as contacting each other at locations of the column spacers 320.

The first display panel 100 includes a substrate 110, and a thin film structure disposed on the inner (e.g., upper) surface of the substrate 110. The thin film structure includes a thin film transistor Q, color filters 230B and 230R1, and one or more thin film 40.

Referring to FIG. 1 and FIG. 2 again, the respective color filters 230R, 230R1, 230R2, 230G, and 230B longitudinally extend in a column direction so as to make a stripe or bar shape. The pixel regions RP, GP, or BP expressing the same color are linearly arranged at the respective columns of the corresponding pixel regions RP, GP, or BP. As illustrated in FIG. 1 and FIG. 2, the respective color filters 230R, 230R1, 230R2, 230G, and 230B may be disposed substantially to only one pixel region RP, GP, or BP. In alternative embodiments, the color arrangement at the pixel regions RP, GP, and BP may be altered, and the pixels regions RP, GP, and BP at the row neighbors may be disposed to deviate from each other. In addition, the disposition of the pixel regions RP, GP, and BP and the color filters 230R, 230R1, 230R2, 230G, and 230B may be altered in various manners.

As shown in FIG. 1 and FIG. 2, the left and right boundaries of the color filters 230R, 230R1, 230R2, 230G, and 230B are basically contoured in the shape of a rectilinear line. The left and right boundaries of the color filters 230R, 230R1, 230R2, 230G, and 230B are continuous across more than one colored pixel region RP, GP, or BP expressing the same color linearly arranged at the respective columns of the corresponding pixel regions RP, GP, or BP.

The color filter expressing any one color may include a protrusion protruded toward one of a directly adjacent color filter. In the illustrated embodiment, the red color filter 230R1 (FIG. 1) and 230R (FIG. 2), includes a protrusion 232R protruded toward a directly adjacent color filter 230B neighboring thereto. The left boundary of the red color filter 230R and 230R1 is projected toward the blue color filter 230B at the area of the protrusion 232R. In contrast, the right boundary of the red color filter 230R and 230R1 is substantially continuously, straight without including any protrusions extending therefrom.

As shown in FIG. 3 and FIG. 4, the protrusion 232R of the red color filter 230R and 230R1 is overlapped with the blue color filter 230B, when taken in the schematic (e.g., plan) view of FIG. 1 and FIG. 2. The protrusion 232R may be disposed over the thin film transistor Q. An entire of the protrusion 232R may overlap a portion of the thin film transistor Q, as shown in the illustrated embodiment. A portion of the first display panel 100 at the area of the thin film transistor Q has the greatest height, and the overlapped portion of the protrusion 232R and the blue color filter 230B is higher than all other portions of the first display panel 100. The height is taken substantially perpendicular to the first display panel 100.

At least a part of the protrusion 232R is disposed over the blue color filter 230 irrespective of misalignment of the color filters 230B and 230R/230R1. FIG. 3 illustrates the correct alignment state of the two color filters 230B and 230R/230R1, and FIG. 4 illustrates a misalignment state of the two color filters 230B and 230R/230R1. The overlap length D2 of the two color filters 230B and 230R/230R1, which are misaligned in a withdrawal direction (e.g., horizontally left to right) as shown in FIG. 4, is smaller than the overlap length D1 of the two color filters 230B and 230R/230R1, which are correctly aligned as shown in FIG. 3. The overlapped state of the two color filters 230B and 230R/230R1 is kept constant even when a misalignment occurs. In exemplary embodiments, a length of the protrusion 232R, taken substantially perpendicular from a respective left or right boundary of the color filter 230R/230R1, may be designed to be greater than an interlayer alignment error.

In order to secure the overlapped structure of the two color filters 230B and 230R/230R1, as shown in FIG. 2, a protrusion 232B may also be disposed at the blue color filter 230B. The protrusion 232B of the blue color filter 230B may be larger in width taken in a vertical direction of FIG. 2, but smaller in length taken in a horizontal direction of FIG. 2 than the protrusion 232R of the red color filters 230R and 230R1 (FIG. 1). When the protrusion 232B is extended from a boundary (e.g., right boundary) of the blue color filter 230B, the length of the protrusion 232R of the red color filters 230R and 230R1 may be smaller than the alignment error, where a sum in length of the protrusion 232B of the blue color filter 230B and the protrusion 232R of the red color filters 230R and 230R1 is greater than the alignment error. The width may also be considered taken in a longitudinal direction of the color filter 230R/230R1 and 230B, and the length may also be considered taken in a transverse direction of the color filter 230R/230R1 and 230B, where the transverse direction is substantially perpendicular to the longitudinal direction.

In a plan view, such as shown in FIG. 2, the protrusions 232R and 232B are linearly aligned in the transverse direction of the color filters 230R/230R1 and 230B, and extend from a respective boundary of the 230R/230R1 and 230B in opposite directions to each other.

As shown in FIG. 2, a protrusion 232G is extended from a boundary of the green color filter 230G, and has substantially a same shape and dimension as the protrusion 232B of the blue color filter 230B. In an exemplary embodiment, the substantially same shape and dimension may be obtained because the green color filter 230G and the blue color filter 230B are formed using the same mask, so as to reduce the mask usage which reduces manufacturing costs and time.

As shown in FIG. 3 and FIG. 4, the spacer 320 of the second display panel 200 may be disposed corresponding to an area of the protrusion 232R of the red color filter 230R and 230R1. In FIG. 1 and FIG. 2, reference numeral 321 is used to refer to such a spacer 320. As used herein, "corresponding" may refer to substantially coinciding in positional placement, dimension and/or shape. As shown in FIGS. 1-4, a whole of the protrusion 232R of the red color filter 230R and 230R1 is overlapped with the spacer 320/321. The spacer 320/321 of the second display panel 200 may be disposed corresponding to an area of the protrusion 232R of the red color filter 230R and 230R1 because, as explained previously, the portion of the first display panel 100 at the protrusion 232R is the highest. Advantageously, since the two color filters 230B and 230R/230R1 may always be overlapped with each other at the area of the protrusion 232R, a predetermined height can be maintained thereat, thereby maintaining a thickness of the liquid crystal layer 3 to be substantially constant.

As shown in FIG. 2, the spacers 321 may be disposed in pixel regions that are not disposed adjacent to each other. Alternatively, a spacer 321 may be disposed in adjacent pixel regions corresponding to the same color pixel region.

In exemplary embodiments, the color filters 230R, 230R1, 230R2, 230G, and 230B may be formed to include a colored photosensitive organic material. Referring to FIG. 3 and FIG. 4, a portion of the color filter 230R1 overlapped with the blue color filter 230B at the area of the protrusion 232R, may be smaller in thickness, taken in a vertical direction of FIGS. 3 and 4, than any other portions due to the characteristic of the organic material.

In an exemplary embodiment shown in FIG. 1, the red color filter 230R1 may include a concave portion 233R in addition to the protrusion 232R. The concave portion 233R may be considered as the left boundary extending in the transverse direction of the color filter 230R1 and toward a main body of the color filter 123R1. The spacer 320 shown in FIG. 3 and FIG. 4 may be disposed at the area of the concave portion 233R.

The concave portion 233R is disposed contrary to the function of the protrusion 232R, such that the red color filter 230R1 and the blue color filter 230B may not be overlapped with each other at the area of the spacer 322, irrespective of the misalignment. A length taken in a transverse direction of the color filter 230R/230R1, of the concave portion 233R may be greater than the interlayer alignment error, and such a concave portion (not shown) may be provided at the blue color filter 230B.

Advantageously, the height of the first display panel 100 may be maintained to be constant at all places where the concave portion 233R is disposed. In contrast, when the area of the concave portion 233R is lower in height than the area of the protrusion 232R, the spacer 320 at that area may not contact the first display panel 100.

The spacer 320/322 at the area of the concave portion 233R has a secondary function of maintaining the thickness of the liquid crystal layer 3 to be substantially constant, and a primary function of absorbing shock to the liquid crystal display due to pressure applied from the outside, etc. As shown in FIG. 1, the spacer at the area of the protrusion 232R is a primary spacer 321, and the spacer at the area of the concave portion 233R is a secondary spacer 322. In an exemplary embodiment, a first height of the first display panel 100 at an area of the secondary spacer 322 may be lower than a second height of the first display panel 100 at an area of the protrusion 232R.

In exemplary embodiments, a distance between the primary and the secondary spacers 321 and 322 neighboring each other (e.g., directly adjacent to each other) may be shorter than the distance between neighboring primary spacers 321. In a plan view of the longitudinal direction of the color filters, the secondary spacer 322 is disposed between adjacent primary spacers 321.

A size of the protrusions 232R, 232G, and 232B and the concave portion 233R may have no relationship to a size of the spacer 320/321/322, but may be established to be smaller than the spacer 320/321/322, such as to reduce an area or space occupied thereby when taken in the plan view. As used herein, "size" may include length, width and/or thickness as discussed above.

In the illustrated embodiment of FIG. 1, the secondary spacer 322 does not overlap the color filter 230R1, and the left boundary of the color filter 230R1 at the concave portion 233R is separated from the secondary spacer 322 in a plan view. The primary and secondary spacers 321 and 322 may be substantially a same dimension (e.g., occupy a same area) in the plan view, or may be different from each other. The primary and secondary spacers 321 and 322 may also be linearly aligned in the plan view as shown in FIG. 1.

When needed, the protrusions 232R, 232G, and 232B and the concave portion 233R may be provided at any desired places with a desired density (e.g., quantity, positional placement relative to other protrusions). Occasionally, as shown in FIG. 1, some of the red color filters 230R may be formed without the protrusions 232R, 232G, and 232B and the concave portion 233R.

In an exemplary embodiment of a method of manufacturing a liquid crystal device, at least two masks, including a mask for forming the red color filter 230R with the protrusion 232R and a mask for forming the remaining green and blue color filters 230G and 230B may be required to process all the color filters 230R, 230G, and 230B. Here, only the red color filter 230 may differ in shape from the other color filters such that the green and blue color filters 230G and 230B have the same shape.

In an exemplary embodiment, the spacers 320 may be disposed at not all the places of the protrusions 232R, 232G, and 232B and the concave portions 233R, but only at desired places to achieve a desired density. In the illustrated embodiment in FIG. 1 and FIG. 2, that the spacer 321/322 is positioned at the blue pixel region BP, but it is also within the scope of the invention that the spacer 321 and/or 322 is located at other pixel regions, such as RP and/or GP. In the latter case, the locations of the protrusions 232R, 232G, and 232B and the concave portion 233R may be varied accordingly. In alternative embodiments, the spacers 320/321/322 may be disposed on the first display panel 100 as well as on the second display panel 200, where the spacers 320/321/322 may be limited in size due to the protrusions 232R, 232G, and 232B, the concave portions 233R.

The color filters 230R, 230R1, 230R2, 230G, and 230B neighboring each other may be overlapped with each other at all remaining portions of the color filters 230R, 230R1, 230R2, 230G, and 230B, except at the area of the protrusions 232R, 232G, and 232B and the concave portions 233R. Alternatively, the color filters 230R, 230R1, 230R2, 230G, and 230B may not be overlapped with each other at all the remaining portions, but may coincide with each other at the boundaries thereof at some or all of the boundaries. The color filters may also be disposed spaced away from each other at portions of the color filter boundaries. It is illustrated in FIG. 1 and FIG. 2 that the color filters are overlapped with each other.

Another exemplary embodiment of a liquid crystal display according to the present invention will now be described in detail with reference to FIG. 5 to FIG. 7.

Figure 5:
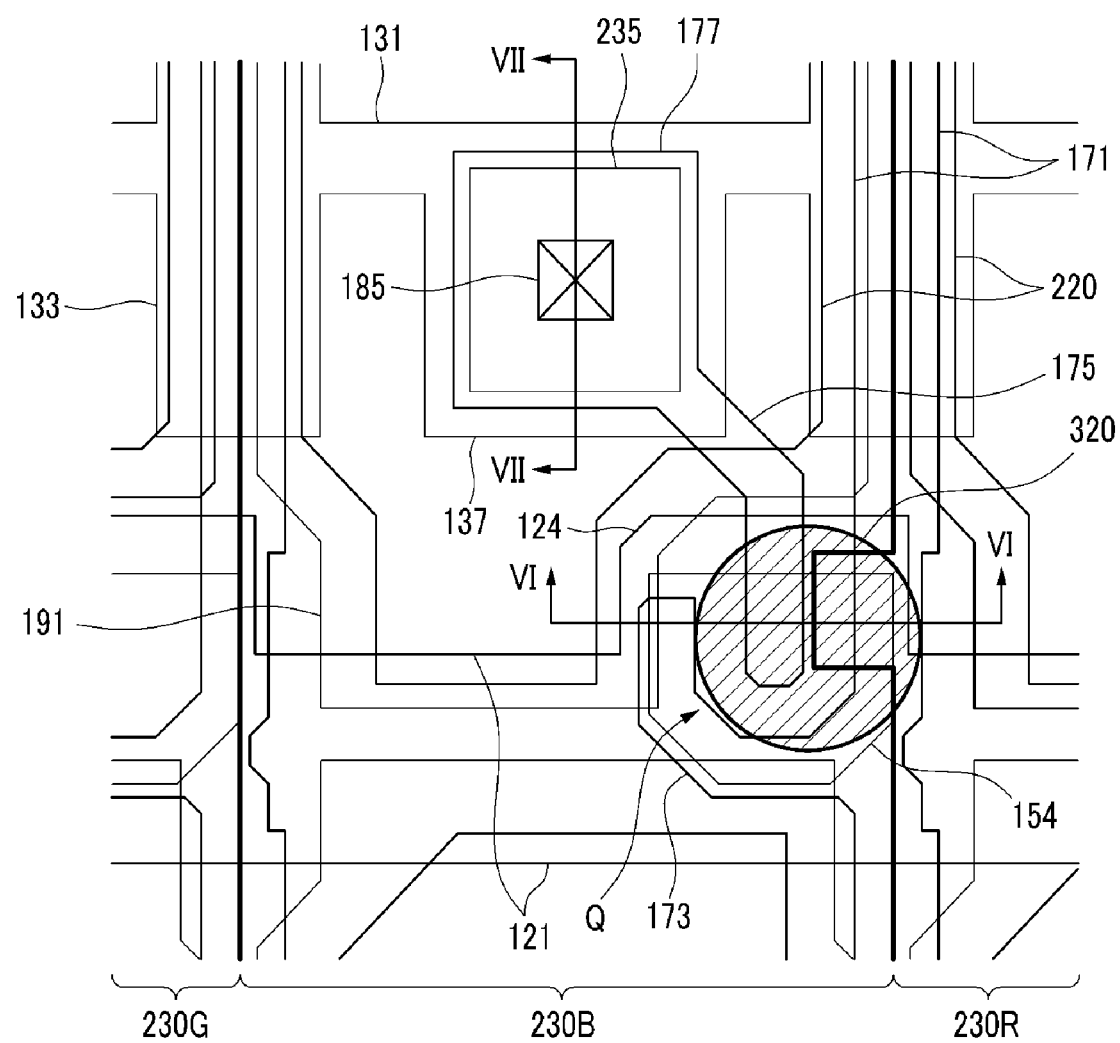
FIG. 5 is a layout view of another exemplary embodiment of a liquid crystal display according to the present invention.
Figure 6:
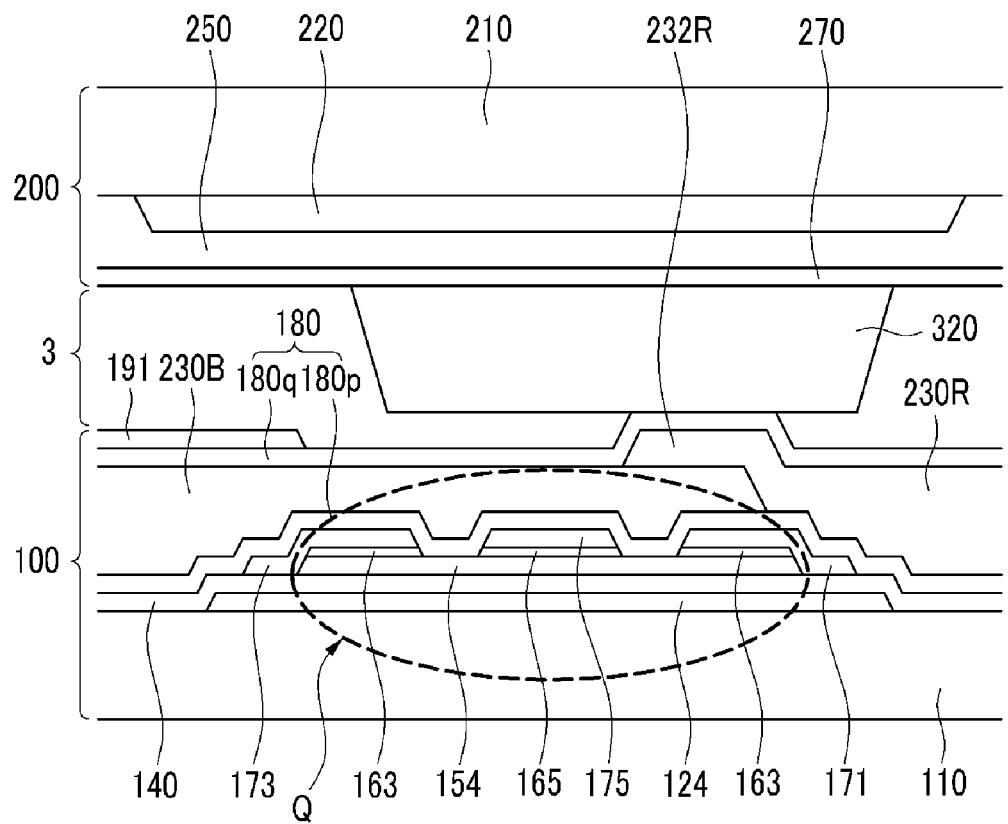
FIG. 6 is a cross-sectional view of the liquid crystal display shown in FIG. 5 taken along line VI-VI thereof.
Figure 7:
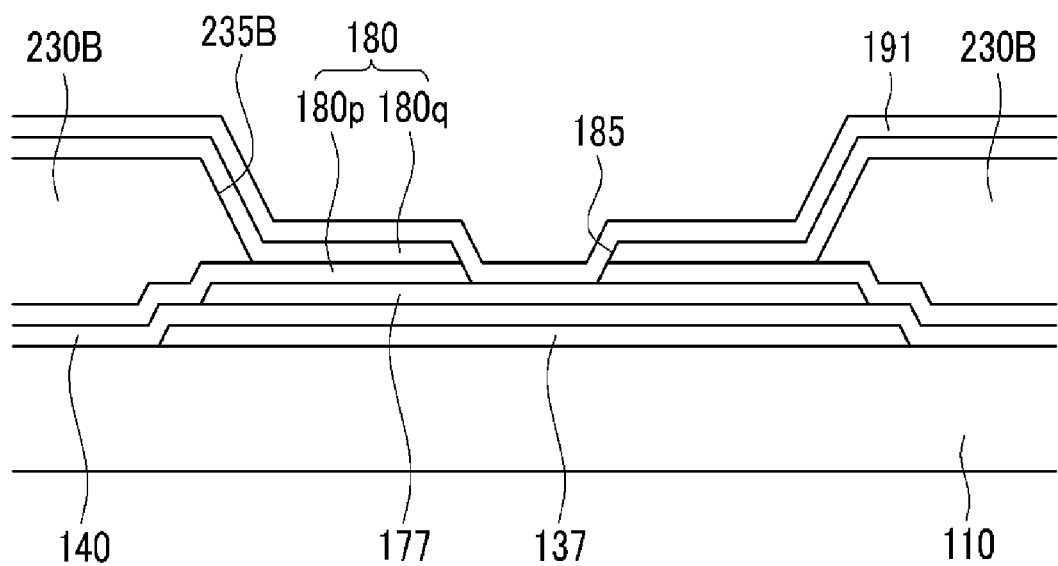
FIG. 7 is a cross-sectional view of a first display panel of the liquid crystal display shown in FIG. 5 taken along line VII-VII thereof.

FIG. 5 is a layout view of another exemplary embodiment of a liquid crystal display according to the present invention, FIG. 6 is a cross-sectional view of the liquid crystal display shown in FIG. 5 taken along line VI-VI thereof, and FIG. 7 is a cross-sectional view of a first display panel of the liquid crystal display shown in FIG. 5 taken along line VII-VII thereof.

Referring to FIG. 5 to FIG. 7, a liquid crystal display includes a first display panel 100, a second display panel 200, and a liquid crystal layer 3.

The liquid crystal layer 3 has positive dielectric anisotropy, and liquid crystal molecules of the liquid crystal layer 3 are aligned such that the directors thereof stand substantially parallel to the surface of the two display panels 100 and 200 with no application of an electric field.

An alignment layer (not shown) may be disposed on the inner surface of each of the display panels 100 and 200. The alignment layer may be a horizontal alignment layer. A polarizer (not shown) may be provided on the outer surface of each of the display panels 100 and 200.

The second display panel 200 will be firstly described in detail.

A light blocking member 220 is disposed on an insulating substrate 210 based on transparent glass or plastic. The light blocking member 220, may also be referred to as a black matrix, and may include a plurality of openings arranged substantially in a matrix.

An overcoat 250 layer is disposed on the substrate 210 and the light blocking member 220. The overcoat layer 250 directly contacts both the insulating substrate 210 and the light blocking member 220. In an exemplary embodiment, the overcoat 250 layer may include with an (organic) insulating material, or may be omitted.

A common electrode 270 is disposed on the overcoat layer 250, and directly contacts the overcoat layer 250. In an exemplary embodiment, the common electrode 270 may include a transparent conductor such as ITO and IZO, and a common voltage is applied thereto.

A column spacer 320 is disposed on the common electrode 270. In an exemplary embodiment, the spacer 320 may include an organic material, and is overlapped with the light blocking member 220. The spacer 320 contacts the first display panel 100, such as directly contacting the common electrode 270. A whole of the spacer 320 may be overlapped with the light blocking member 220.

An alignment layer (not shown) may be disposed on the common electrode 270 and the spacer 320. The alignment layer disposed on the spacer 320 directly contacts the first display panel 100.

The first display panel 100 will now be described in detail.

Gate lines 121 and storage electrode lines 131 are disposed on an insulating substrate 110 based on transparent glass or plastic. The gate lines 121 and the storage electrode lines 131 both extend in a first direction, and substantially parallel to each other.

The gate lines 121 proceed mainly in the horizontal direction and carry gate signals. The gate lines 121 each include a plurality of gate electrodes 124 protruded upward therefrom, as illustrated in FIG. 5.

The storage electrode lines 131 proceed substantially parallel to the gate lines 121, and a predetermined voltage is applied thereto. The storage electrode lines 131 are disposed adjacent to a lower side of the gate lines 121. The storage electrode lines 131 include a primary storage electrode 137 extended downward substantially in the shape of a square, and a secondary storage electrode 133 longitudinally extended upward and downward, as illustrated in FIG. 5. The primary storage electrodes 137 and the secondary storage electrodes 133 are alternately arranged in a horizontal direction of FIG. 5. In alternative embodiments, the shape and positional placement of the storage electrode lines 131, the primary storage electrodes 137 and the secondary storage electrodes 133, may be altered in various manners.

Referring again to FIG. 6 and FIG. 7, a gate insulating layer 140 is disposed on the gate lines 121 and the storage electrode lines 131. In an exemplary embodiment, the gate insulating layer 140 may include silicon nitride (SiNx) or silicon oxide (SiOx).

Semiconductor islands 154 are disposed on the gate insulating layer 140. The semiconductor islands 154 may include hydrogenated amorphous silicon (abbreviated as a-Si) or polysilicon. The semiconductor islands 154 are disposed over the gate electrodes 124.

Ohmic contact islands 163 and 165 are disposed on the semiconductor islands 154. The ohmic contacts 163 and 165 may be formed with n+ hydrogenated amorphous silicon where an n-type impurity is doped at high concentration, or of silicide.

Data lines 171 and drain electrodes 175 are disposed on the ohmic contacts 163 and 165, and the gate insulating layer 140.

The data lines 171 extend substantially in the vertical direction (FIG. 5), and cross the gate lines 121. The data lines 171 are overlapped with the secondary storage electrodes 133, and are disposed adjacent to the gate electrodes 124. Each data line 171 includes a source electrode 173 including a bent shape, and overlaps the gate electrode 124. The source electrode 173 may be considered disposed substantially in the shape of the capital letter J.

Referring again to FIG. 5, each drain electrode 175 is separated from the data line 171, and includes a narrow portion and a wide portion 177. The narrow portion is partially surrounded by the source electrode 173 at its end, as shown in the plan view of FIG. 5. The wide portion 177 is formed substantially in the shape of a square, and is overlapped with the primary storage electrode 137. The wide portion 177 of the drain electrode 175 charges the same area as the primary storage electrode 137, but does not extend out of the primary storage electrode 137.

A gate electrode 124, a source electrode 173, and a drain electrode 175 form a thin film transistor (TFT) Q in association with a semiconductor 154. A channel of the thin film transistor Q is formed at the semiconductor 154 between the source and drain electrodes 173 and 175.

The ohmic contacts 163 and 165 are existent only between the underlying semiconductors 154 and the overlying data lines 171 and drain electrodes 175 so as to lower the contact resistance therebetween. The semiconductors 154 include exposed portions not overlapped with the data lines 171 and the drain electrodes 175, including portions between the source and drain electrodes 173 and 175.

A passivation layer 180 is disposed on the data lines 171, the drain electrodes 175, and the exposed portions of the semiconductors 154. The passivation layer 180 includes a lower film 180$p$ and an upper film 180$q$ based on an inorganic insulator of silicon nitride or silicon oxide. In alternative embodiments, at least one of the lower and upper films 180$p$ and 180$q$ may be omitted.

A contact hole 185 is disposed at the passivation layer 180 so as to expose the wide portion 177 of the drain electrode 175.

Referring again to FIG. 6, red, green, and blue color filters 230R, 230G, and 230B are disposed between the lower and upper films 180p and 180q of the passivation layer 180. The color filters 230R, 230G, and 230B charge the area between the neighboring data lines 171. The left and right boundaries of the color filters 230R, 230G, and 230B are disposed overlapping a portion of the data lines 171. The boundaries of the color filters 230R, 230G, and 230B may longitudinally extend in a same direction as the data lines 171 in the vertical direction and be substantially parallel with the data lines, and in this case, the color filters 230R, 230G, and 230B may be stripe-shaped.

The left and right boundaries of the green and blue color filters 230G and 230B are substantially straight in their entireties. The left and right boundaries of the red color filter 230R are substantially straight, but the left boundary thereof includes a protruded portion extended toward the blue color filter 230B proximate to the thin film transistor Q. The protruded portion of the red color filter 230R may also be referred to as a protrusion 232R (FIG. 6). The protrusion 232R is overlapped with the blue color filter 230B in a plan view, and as shown in FIG. 6. In exemplary embodiments, the protrusion 232R may be smaller in thickness taken in a vertical direction of FIG. 6 than other portions of the red color filter 230R.

The length of the protrusion 232R taken in a horizontal direction in FIG. 6, may be greater than the interlayer alignment error. In one exemplary embodiment, in case the interlayer alignment error is 2 micrometers (μm), the length of the protrusion 232R is about 3 μm or more. A distal end of the protrusion 232R may extends towards and reach to a center of the channel of the thin film transistor Q, or the protrusion 232R may extend maximally to a range capable of being completely covered (e.g., overlapped) by the light blocking member 220 of the second display panel 200. Considering the alignment error of the first and second display panels 100 and 200, the distal end of the protrusion 232R may extend to a position separated from the boundary of the light blocking member 220 by the alignment error. In one exemplary embodiment, when an alignment error between the display panels 100 and 200 is approximately 3 μm, the protrusion 232R may extend to a position away from the boundary of the light blocking member 220 by about 3 μm.

The portion of the first display panel 100 at the protrusion 232R is the highest taken in a thickness, or vertical direction, of FIG. 6. The highest portion of the first display panel 100 contacts the spacer 320 of the second display panel 200. As illustrated in FIG. 6, the first display panel 100, including the upper film 180q of the passivation layer 180, directly contacts the spacer 320 of the second display panel 200.

Referring again to FIGS. 6 and 7, an opening 235 is disposed at the respective color filters 230R, 230G, and 230B over the wide portion 177 of the drain electrode 175. The opening 235 substantially charges the area as the wide portion 177 of the drain electrode 175, but does not extend out of the wide portion 177. An area defined by the opening 235 may be completely overlapped by the wide portion 177 of the drain electrode 175. In the illustrated embodiment of FIG. 7, an entire of opening 235B in the blue color filter 230B is overlapped by the wide portion 177. The contact hole 185 in the passivation layer 180 is included within the opening 235 of the color filter 230.

In exemplary embodiments, the color filters 230R, 230G, and 230B may be formed with a photosensitive organic material including a pigment.

A pixel electrode 191 is disposed on the upper film 180q of the passivation layer 180. In exemplary embodiments, the pixel electrode 191 may be formed with a transparent conductive material such as ITO and IZO, or a reflective metal such as aluminum, silver, chromium, and alloys thereof.

The pixel electrode 191 is connected to the drain electrode 175 of the thin film transistor Q through the contact hole 185, and receives a data voltage from the drain electrode 175. Upon receipt of the data voltage, the pixel electrode 191 generates an electric field in association with the common electrode 270 (FIG. 6) of the second display panel 200, to orient the liquid crystal molecules of the liquid crystal layer 3 between the two electrodes 191 and 270. The light having passed through the liquid crystal layer 3 is differentiated in luminance depending upon the direction of the oriented liquid crystal molecules.

A pixel electrode 191 and the common electrode 270 form a liquid crystal capacitor so as to maintain the voltage applied thereto even after the thin film transistor turns off.

The pixel electrode 191 and the drain electrode 175 connected thereto are overlapped with the storage electrode line 131, including the primary and secondary storage electrodes 137 and 133, to form a storage capacitor.

Referring to the plan view of FIG. 5, a boundary of the pixel electrode 191 is partially bent such that it does not overlap the thin film transistor Q. The edges of the pixel electrode 191 and the thin film transistor Q may be completely overlapped with the light blocking member 220 and the secondary storage electrode 133. In this structure, as the secondary storage electrode 133 is larger in width than the light blocking member 220, the light incident from a backlight unit disposed under the display panels, such as at a side opposite to a viewing side of a display device, can essentially be reduced or blocked in an effective manner.

An alignment layer (not shown) may be disposed on the pixel electrode 191 and the passivation layer 180.

The color filters shown in FIG. 1 and FIG. 2 may be applied to the structure shown in FIG. 5 to FIG. 7.

As illustrated in the exemplary embodiments, the color filter 230R is provided with the protrusion 232R, the color filters 230R and 230B are always overlapped with each other even when a misalignment occurs, and the spacer 320 is mounted at the overlapped area of the color filters 230R and 230B to advantageously maintain the thickness of the liquid crystal layer 3 to be constant.

Alternatively, in order to maintain the thickness of the liquid crystal layer 3 substantially constant, it is possible that the color filters 230R and 230B are not overlapped with each other at the location area of the spacer 320. Specifically, a recess may be disposed at one side of a color filter or at both sides of color filters instead of the protrusion to thereby place the color filters away from each other. However, in this structure, the distance between the color filters becomes so large as to make a narrow groove. Such a narrow groove is liable to be filled with a transparent conductor deposited for forming the pixel electrode 191 during a manufacturing process, so that the pixel electrodes 191 around the groove may be short circuited.

Therefore, it is preferred to design the color filters such that they are overlapped with each other as in the illustrated exemplary embodiments, rather than to make them not overlap each other.

Particularly as shown in FIG. 5, the left bottom edge of the pixel electrode 191 is slightly recessed. However, under the application of the structure shown in FIG. 2 where a protrusion 232G is disposed at the green color filter 230G, gaps due to the distancing between the green and blue color filters 230G and 230B are advantageously reduced or effectively prevented even when a misalignment of display panels occurs. Accordingly, the transparent conductor undesirably deposited between the pixel electrodes 191 during the formation thereof so as to short circuit the pixel electrodes 191 with each other, is reduced or effectively prevented.

The previously-described structure according to the illustrated exemplary embodiments of the present invention may be applied to a liquid crystal display including various structures, including a structure where the pixel electrode 191 and the common electrode 270 are disposed at the first display panel 200 in the shape of a stripe.

The previously-described structure according to the illustrated exemplary embodiments of the present invention may be applied to other display devices requiring spacers as well as a liquid crystal display. In this case, the liquid crystal layer 3 according to the illustrated embodiments may be replaced by another electro-optical active layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first display panel comprising a first substrate, and first and second color filters disposed on the first substrate adjacent to each other;
    a second display panel comprising a second substrate facing the first display panel, and a first spacer disposed on the second substrate; and
    a liquid crystal layer disposed between the first and second display panels,
    wherein the first color filter includes a first protrusion extended toward the second color filter and overlapped with the second color filter, and the first spacer of the second display panel faces the first protrusion of the first color filter, the first and second display panels contacting each other at an area of the first spacer.

2. The liquid crystal display of claim 1, wherein the first protrusion is smaller in size than the first spacer.

3. The liquid crystal display of claim 1, wherein the first display panel further comprises a first thin film transistor disposed on the first substrate and overlapped with the first protrusion of the first color filter, and a first pixel electrode connected to the first thin film transistor.

4. The liquid crystal display of claim 3, wherein the second color filter is disposed between the first protrusion of the first color filter and the first substrate.

5. The liquid crystal display of claim 4, wherein the second color filter includes a second protrusion protruded toward the first color filter and disposed adjacent to the first protrusion.

6. The liquid crystal display of claim 3, wherein the first display panel further comprises a third color filter disposed adjacent to the second color filter, and the first to third color filters display different colors, respectively, the second and third color filters having a same shape, and the first color filter differs in shape from the second and third color filters.

7. The liquid crystal display of claim 3, wherein the first display panel further comprises a second thin film transistor disposed on the first substrate and separated from the first thin film transistor, and a second pixel electrode connected to the second thin film transistor, and
    the second display panel further comprises a second spacer having a same height as the first spacer and facing the second thin film transistor, a first portion of the first display panel facing the second spacer being lower in height than a second portion of the first display panel facing the first protrusion.

8. The liquid crystal display of claim 7, wherein one of the first and second color filters includes a concave portion disposed adjacent to the second thin film transistor.

9. A liquid crystal display comprising:
    a first display panel comprising:
        a first substrate,
        a plurality of thin film transistors disposed on the first substrate, and
        first, second, and third color filters disposed on the first substrate and displaying different colors;
    a second display panel facing the first display panel; and
    a liquid crystal layer disposed between the first and second display panels,
    wherein the first to third color filters display different colors, respectively, the second and third color filters have the same shape, and the first color filter comprises a first portion differing in shape from the second and third color filters, and a second portion having the same shape as the second and third color filters.

10. The liquid crystal display of claim 9, wherein the first portion of the first color filter is disposed adjacent to the thin film transistors.

11. The liquid crystal display of claim 10, further comprising a spacer overlapped with the first portion of the first color filter.

12. The liquid crystal display of claim 11, wherein the spacer is disposed on the second display panel.

13. The liquid crystal display of claim 12, wherein the first and second display panels contact each other adjacent to the first portion of the first color filter.

14. The liquid crystal display of claim 13, wherein the first portion of the first color filter is overlapped with the second color filter.

15. The liquid crystal display of claim 14, wherein the second color filter comprises a protrusion protruded toward the first portion of the first color filter.

16. The liquid crystal display of claim 12, wherein the first portion of the first color filter is disposed separated from the second and third color filters.

17. The liquid crystal display of claim 12, wherein the spacer is larger in area than the first portion of the first color filter, in a plan view.

18. A method of manufacturing a liquid crystal display, the method comprising:
    disposing a first and a second color filter of a first display panel directly adjacent to each other, the first color filter including a first protruded portion extended in a first direction toward the second color filter;
    disposing a second display panel facing the first display panel, the second display panel including a spacer disposed facing the first protruded portion of the first color filter;
    disposing a liquid crystal layer between the first and second display panels;
    wherein the first protruded portion overlaps with the second color filter, and the first and second display panels contact each other where the first protruded portion is disposed.

19. The method of claim 18, wherein the second color filter includes a second protruded portion extended in a second direction toward the first color filter, the second direction being opposite to the first direction, and the second protruded portion overlaps with the first color filter at a position adjacent to the first protruded portion, in a plan view.

20. The method of claim 18, wherein an entire of the first protruded portion is overlapped by the spacer, in a plan view.

* * * * *